United States Patent

Macur

[11] 3,839,178
[45] Oct. 1, 1974

[54] POTENTIOMETRIC OXYGEN SENSOR

[75] Inventor: Robert A. Macur, Milwaukee, Wis.

[73] Assignee: General Electric Company, Schenectady, N.Y.

[22] Filed: Oct. 5, 1972

[21] Appl. No.: 295,248

[52] U.S. Cl. .............................. 204/195 P, 204/1 T
[51] Int. Cl. .......................................... G01h 27/46
[58] Field of Search ............ 204/1 T, 195 R, 195 P

[56] References Cited
UNITED STATES PATENTS

| 3,098,813 | 7/1963 | Beebe et al. ...................... 204/195 P |
| 3,141,835 | 7/1964 | Rolin et al. ...................... 204/195 R |
| 3,462,353 | 8/1969 | Every et al. ...................... 204/195 F |

*Primary Examiner*—T. Tung
*Attorney, Agent, or Firm*—Ralph G. Hohenfeldt; Fred Wiviott

[57] ABSTRACT

A sensor for the partial pressure of oxygen comprises an electrode which reduces oxygen and which itself corrodes or oxidizes to produce a potential that varies with the rate of oxygen reduction. A silver halide reference electrode is encapsulated in a common electrolyte with the aforesaid electrode and the electrolyte is surrounded by an oxygen permeable, ion impermeable membrane. The electrolyte includes a halide salt and a buffer.

15 Claims, 1 Drawing Figure

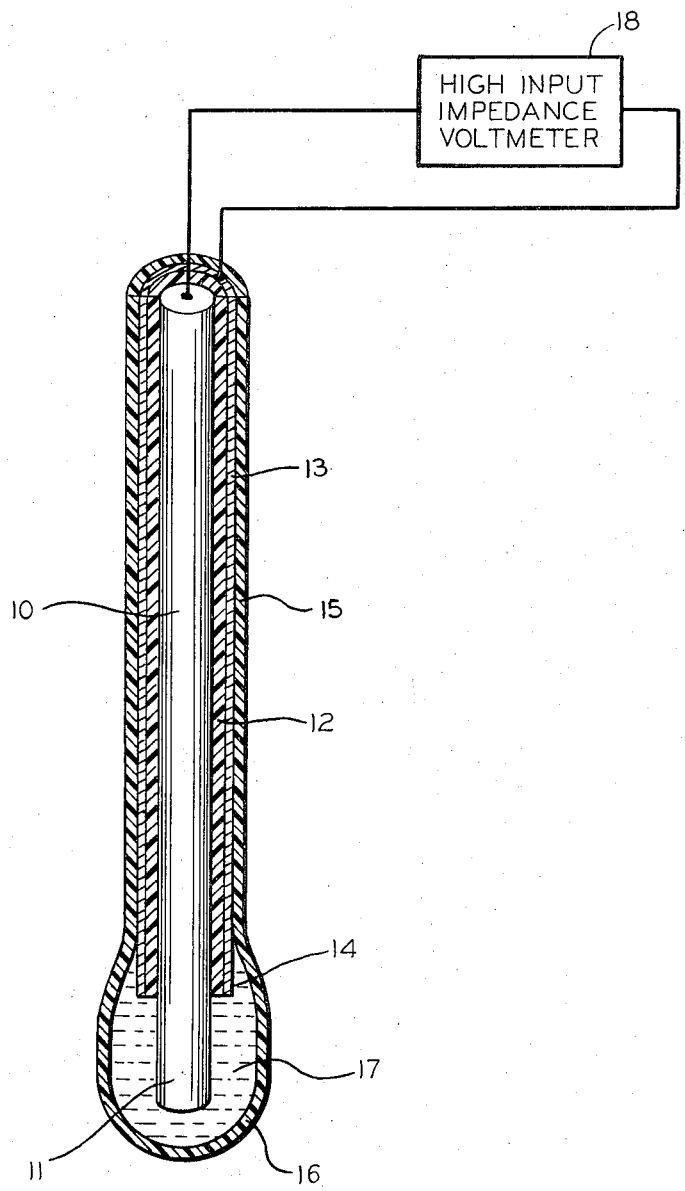

POTENTIOMETRIC OXYGEN SENSOR

BACKGROUND OF THE INVENTION

This invention relates to an electrode assembly or sensor for determining the partial pressure of oxygen in gaseous or other fluid mixtures. The illustrative embodiment of the new sensor is especially useful for measuring the partial pressure of oxygen in body fluids such as blood in vitro or in vivo.

Oxygen sensors in general use today are the polarographic type which produce current variations corresponding with the rate at which oxygen is reduced at the cathode electrode of two half-cells. The sensors comprise a cathode, usually a noble metal such as gold, silver or platinum, and an anode counter electrode which is usually of the silver-silver chloride type. The cathode and anode are immersed in a common electrolyte which is contained within an oxygen permeable membrane. A constant voltage of about 0.5 to 0.6 volts is applied across the cathode and anode and a current meter shows variations in current that depend on the transmission rate of oxygen through the membrane and the electrolyte to the cathode where oxygen reduction takes place.

A disadvantage of polarographic systems is that they consume oxygen from the sample liquid or gas mixture. Moreover, when sample fluid viscosity is high, or oxygen mobility and solubility are low, the sample becomes depleted of oxygen at the interface with the membrance and a partial pressure gradient develops outside of the membrane. This gradient adversely affects the desired linear correspondence between oxygen concentration in the sample and current magnitude. The high oxygen consumption of this type of sensor is manifested by it being sensitive to flow and dictates that the sample be agitated vigorously at all times. Stated in another way, the linearity between current and partial pressure, $pO_2$, is limited by the rate at which the oxygen is transported from the sample through the membrane to the cathode. Thus, it is evident that the foregoing circumstances can also produce nonlinearity since all of the oxygen pressure gradient is not confined to the membrane. The oxygen reduction rate and corresponding measured current is proportional to the thickness of the membrane and the rate of change is proportional the square of the membrane thickness. If a lot of oxygen is consumed in the sensor, the boundary conditions extend beyond the membrane for an undefineable distance into the sample, thereby making calibration of the sensor over its full partial pressure range difficult.

Besides lacking precision and stability, prior oxygen sensors are difficult to construct, calibrate and use in sizes that make them suitable for use in a blood vessel or in testing microsamples for $pO_2$.

SUMMARY OF THE INVENTION

Objects of the present invention are to provide a sensor for measuring the partial pressure of oxygen which is precise, easy to make and use, rugged, is capable of being made very small, and, in the type that is used for sensing blood oxygen, is sufficiently inexpensive to justify disposal after use in a single subject or sample.

A still further object is to provide an oxygen sensor of the potentiometric type which produces voltage variations corresponding with $pO_2$ variations rather than one which produces current variations that depend on the amount of oxygen consumed or reduced.

Another object is to provide a sensor which employs a gas permeable, ion-impermeable membrane but is not limited by the rate of diffusion through the membrane.

Still another object is to provide a potentiometric sensor to which no external driving voltage need be applied but which produces voltage variations with varying $pO_2$.

Other objects are to provide a sensor: which is not adversely affected by flow characteristics of the sample, nor by sample viscosity or other physical or chemical characteristics thereof; which is insensitive to pH, is unaffected by variables such as intravascular placement; and, which is compatible with potential measuring instruments that are often used for other potentiometric sensors such as pH and $pCO_2$ sensors.

Another object is to provide an oxygen sensor for a variety of clinical and nonclinical applications such as for sensing oxygen in blood, inspired and expired air, liquid food products, beverages such as beer and wine and sewage, for example.

How the foregoing and other more specific objects of the invention are achieved will appear in the more detailed description of an illustrative embodiment of the invention which follows shortly hereinafter.

In general terms, the new sensor comprises a single electrode which has anodic and cathodic sites whose voltage depends on oxygen pressure and which is referenced to another electrode whose voltage is independent of oxygen partial pressure changes. The anodic-cathodic sensing electrode may be made of tungsten, molybdenum or tantalum, in that order of preference, or alloys of these metals and it may be made of other metals which reduce oxygen and have a suitably and comparably low corrosion rate. A silver-silver halide reference electrode, preferably Ag—AgCl, is spaced by means of suitable insulation with respect to the sensing electrode. The space between the two electrodes is occupied by an electrolyte. A highly oxygen permeable, ion impermeable and diffusion non-limited plastic membrane separates the electrolyte and electrode assembly from the sample in which the partial pressure of oxygen is to be sensed. Oxygen transport is reversible from the electrolyte to the sample and from the sample to the electrolyte. The potential of the mixed or anodic-cathodic measuring electrode is determined by the oxygen partial pressure and the corrosion rate of the electrode. The potential difference between the mixed potential electrode and the reference electrode is measured with a high input impedance voltmeter and is correlated with partial pressure of oxygen.

An illustrative embodiment of the invention will now be described in reference to the drawing.

DESCRIPTION OF THE DRAWING

The drawing shows a fragmentary cross-section of a sensor in a configuration which is especially well adapted for measuring the partial pressure of oxygen in blood within a blood vessel, the sensor being connected to a voltmeter which is illustrated symbolically.

DESCRIPTION OF A PREFERRED EMBODIMENT

The active portion of a sensor for the partial pressure of oxygen in a blood vessel is shown with exaggerated dimensions in the drawing. It will be understood that the sensor, when adapted for blood vessel use, may have an outside diameter of only about 20 mils and may be a few inches long. The sensor is adapted for insertion in the blood vessel through a cannula, not shown, which is introduced into the vessel by puncturing it. Although sealing means are not shown, it will be understood that such known means are present for interlocking the sensor with the cannula to prevent issuance of blood therefrom.

The sensor comprises an oxygen sensing wire electrode 10 which is preferably tungsten but may be molybdenum, tantalum or other suitable mildly corrosive metal or alloys thereof. In a sensor, such as the illustrated one, which is adapted for use in a blood vessel, the oxygen sensing electrode 10 may consist, for example, of a tungsten wire having a diameter of about 10 to 20 mils. Another required property of the oxygen sensing electrode 10 is that it be made of a metal on which oxygen is poorly reduced and that corrodes when it is used as a half-cell in conjunction with a suitable electrolyte and another reference electrode.

Electrode wire 10 is surrounded by an insulating sleeve 12 which desirably bonds tightly with the wire so as to preclude fluid migration along the wire by capillarity. The insulating sleeve 12 may be heat shrunk onto wire 10. It will be observed that insulating sleeve 12 is not coextensive with wire 10 but that the wire has a bare tip 11. In one embodiment, sleeve 12 has a wall thickness of between 2 and 3 mils and is comprised of a copolymer identified by the trademark Tefzel of the DuPont Company. Any good insulating material may be used for sleeve 12 such as Mylar, polypropylene, polyethylene, Teflon, glazed paint or epoxy coating.

Sleeve 12 is surrounded in this example by a concentric tightly fitting silver tube 13 about 2 mils thick on the outside surface of which there is a silver chloride film formed. Thus, the tube 13 constitutes a Ag—AgCl reference electrode whose lower tip 14 is in insulating spaced relationship with respect to the bare tip 11 of wire electrode 10. The silver chloride electrode 13 could be formed by other means such as by depositing silver on insulation 12 and coating the surface of the silver with silver chloride. The silver thickness may vary over a wide range.

The concentric assembly thus far described is surrounded by an oxygen permeable, ion impermeable membrane 15 which forms a sack 16 at its lower end. This membrane may be formed on the body and tip of the electrode assembly by dipping the assembly in a solution of membrane forming material and a solvent and then permitting the solvent to evaporate. A good membrane for the oxygen sensor is a silicone-polycarbonate block copolymer which is described in U.S. Pat. No. 3,189,622 and is made by General Electric Company under the designation MEM-213. Other oxygen permeable, ion impermeable membranes may also be used. Examples of suitable membrane materials are dimethyl silicone, fluorosilicone polymers, natural rubber and polybutylene. The thickness of the membrane 15 should be commensurate with obtaining adequate mechanical strength for the material used. Generally, membrane thickness may be about 2 mils.

The tip of the membrane 15 is formed as a sack 16 to accommodate a quantity of electrolyte 17. In a sensor for determining the partial pressure of oxygen in blood, the electrolyte preferably includes 0.15 M halide salt, excluding fluoride, in aqueous solution and a buffer such as potassium biphthalate.

The molarity, M, of the dissolved halide salt, which may, for example, be potassium or sodium chloride or other salt is not extremely critical in the electrolyte insofar as the involved electrochemical reactions are concerned but in a sensor that is to be used in body fluids such as blood, it is desirable to have a molarity of about 0.15 M since this makes the electrolyte substantially isotonic, or more aptly, isoosmotic with the electrolytes and nonelectrolytes in the body fluid. Making the electrolyte isoosmotic minimizes the tendency for bidirectional migration of water between the body fluid sample and the electrolyte inside of the membrane. Of course, if the sensor is to be used in other sample fluids, the molarity of the electrolyte salt will be adjusted upwardly or downwardly to match the osmotic pressure resulting from the sample itself.

Although tungsten which is an illustrative electrode material, may have several oxidation states in water, it is believed to oxidize primarily in accordance with the following equation:

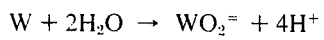
$$W + 2H_2O \rightarrow WO_2^= + 4H^+$$

It will be evident, therefore, that the tungsten half-cell potential varies with the concentration of hydrogen ions. In other words, tungsten potential could be a function of pH which is undesirable. The effect is particularly critical in a sensor used for blood oxygen determination since blood contains appreciable carbon dioxide which ionizes in the presence of water to hydrogen cations and bicarbonate anions. The hydrogen ions, of course, would be formed in the electrolyte if it were permeated by carbon dioxide in which case the pH number of the electrolyte would go down or become more acidic. To preclude the potential variations which would result, a buffer of pH5 is used in the blood oxygen sensor. In sensors using the principles of the invention which are adapted for sensing the partial pressure of oxygen in fluids other than blood such as carbonated beverages or sewerage or food products which may be acidic, it is desirable to use a buffer which would render the oxygen sensor insensitive to $pCO_2$ variations in the sample. Any of the well known buffers such as borate and phosphate may be used but the concentration of the buffer should be commensurate with the buffer capacity desired or, with the desired life expectancy for the particular sensor. The same pH level buffers are required whether the electrode 10 is tungsten, molybdenum, tantalum or other suitable mildly corrodible metal which may be used.

The sensor thus far described and shown in the drawing constitutes two half-cells. The first is the Ag—AgCl reference electrode in the electrolyte 17 and the second is the tungsten, molybdenum or tantalum or other slowly corroding metal in the electrolyte. Partial pressure of oxygen is determined by measuring the potential difference between the reference electrode and the tungsten anodic-cathodic electrode with a high input impedance voltmeter 18 as this difference varies in correspondence with the variations in the partial pressure of oxygen which permeates the membrane and changes the potential at the surface of the tungsten electrode tip 11. It is imperative, therefore, that the potential of the reference electrode be very stable. Invariability of the Ag—AgCl electrode potential is achieved by controlling the concentration of the silver ions in the electrolyte 17. The potential of the silver chloride electrode or half-cell is governed by the Nernst equation as follows:

$$E_{Ag} = E° + 0.0591/n \log [Ag^+]/[Cl^-]$$

Where $E_{Ag}$ is the half-cell potential of Ag, $E°$ is the standard oxidation potential for Ag, $n$ is the number of electrons transferred, and $[Ag^+]$ is the concentration of Ag ions in moles.

It is evident that the half-cell potential depends on the concentration of silver ions. This concentration is set by the concentration of chloride ions in the electrolyte. The solubility product, $K_{sp}$, is $K_{sp} = [Ag^+][Cl^-] = 1.78 \times 10^{-10}$. Thus, $[Ag^+] = 1.78 \times 10^{-10}/[Cl^-]$ and if the $Cl^-$ ion concentration is set, the silver concentration is also set and so is the Ag—AgCl half-cell potential. If $Cl^-$ ions are predetermined as where they have 0.15 M concentration, for example, then chloride concentration determines Ag concentration and $E_{Ag}$ as well. By substituting the silver ion concentration and the molarity of the chloride ions in the Nernst equation, it turns out in this case that the potential of the Ag—AgCl half-cell is +0.272 volts as follows:

$$E_{1/2\,Ag} = 0.799 + 0.0591 \log [1.78 \times 10^{-10}]/[0.15]$$
$$= 0.272 \text{ volts}$$

Of course, if other halide ions were used or other concentrations were used then the reference cell potential would be calculated using a suitable standard potential, the selected molarity and the appropriate solubility product.

It is known that the voltage and current relationship of an Ag—AgCl electrode is such that there is little voltage variation over a wide range of currents in which case it is evident that considerable current may be drawn from the silver chloride electrode without changing its potential appreciably and without polarizing it. Thus, as can be seen in the drawing, a high input impedance voltmeter 18 is connected between the tungsten electrode and the Ag—AgCl reference electrode so that the potential difference between these electrodes will be indicative of the oxygen partial pressure. The input impedance of the voltmeter is typically about $10^{13}$ ohms and the current drawn from the cell or sensor is on the order of $10^{-14}$ amperes or less.

Oxygen permeating membrane 16 and electrolyte 17 is reduced at the tungsten electrode surface 11 in accordance with the following reaction:

$$O_2 + e^- + H_2O \rightarrow 2OH^-$$

The final total reaction of tungsten and water is believed to be as follows:

$$W + O_2 + H_2O \rightarrow WO_2(nH_2O)$$

Protons from the $H_2O$ are neutralized by $OH^-$ ions as per the previous reaction and more $H_2O$ is made. The net result of the reactions is that oxygen is reduced or accepts electrons at the tungsten electrode and at another site on the same electrode the tungsten is oxidized, yielding electrons. The current flow is, therefore, a local cell current on the tungsten and is not between the tungsten and the Ag—AgCl electrode as in the Clark electrode, see Clark, L. C., Tr. Am. Soc. for Art. Int. Organs 2:41, 1956. It may be said properly that the device operates in a potentiometric manner rather than polarographic.

The partial pressure of oxygen is linearly related to the potential difference between the Ag—AgCl reference electrode exposed tip 14 and the tip 11 of the mildly corroding cathode electrode. A plot of this potential difference against the logarithm of $pO_2$ is a straight line.

Tests of the electrode in aqueous solution with controlled and known oxygen partial pressure produced the typical results set forth in the following table.

TABLE I

| $O_2$(%) | Log $pO_2$ (mm Hg) | Sensor Output in Millivolts |
|---|---|---|
|  | 2.88 | − 90.0 |
|  | 2.60 | −100.0 |
| 53.65 | 2.57 | −101.25 |
|  | 2.30 | −110.0 |
| 19.8 | 2.14 | −115.5 |
|  | 2.00 | −120.0 |
|  | 1.70 | −130.0 |
| 5.0 | 1.54 | −135.5 |
|  | 1.41 | −140.0 |
| 2.0 | 1.14 | −149.0 |

It is not necessary to restrict the salt dissolved in electrolyte 17 to sodium chloride. Any electrolyte having a halogen anion such as chloride, bromide or iodide, but not fluoride, may be used. Chloride is preferred. The potential goes down when bromide is used. Generally, however, all the halogen ions do is provide a more insoluble salt and it is the concentration of silver ions that controls the potential of the reference electrode. As mentioned above, it is desirable to establish the molarity of the electrolyte salt at a level which makes the electrolyte substantially isoosmotic with the sample in which the sensor of a particular design is to be used. The normal body fluids such as blood cause an osmotic pressure of about 280 milliosmols from salts and another 20 or so milliosmols from non-ionic blood components, thus bringing up the osmotic pressure to about 300 milliosmols which is substantially equal to 0.15 M halide salt in osmotic pressure. In a sensor adapted for measuring oxygen in salt brine, for instance, a higher molarity would be prescribed for the electrolyte.

Sensors using the principles of the $pO_2$ blood sensor described above may be configured in various ways and produced in various sizes for measuring the partial pressure of oxygen in more voluminous samples such as are available in the fermented beverage industry or in waste disposal or in combustion exhaust products and the like where the new sensor may be effectively used. For instance, the tungsten, molybdenum, tantalum or corrosion exhibiting metal need not be a fine wire but could be a large area plate next to which a silver halide reference electrode is supported. The electrolyte may be in a chamber and the membrane may be disposed as a window in the chamber. Regardless of the configuration or size, the output difference potential between the electrodes is always logarithmically related to the partial pressure of oxygen in the sample to which the membrane is interfaced for the same electrolyte types and concentrations and for the same materials. In gaseous environments, the membrane may not be necessary.

The pH of the buffer in the electrolyte may range from at least 5 to as high as 8 depending on the carbon dioxide concentration of the sample. The Ag—AgCl reference electrodes may be made in accordance with any of the well established methods described in the literature. The measuring electrode such as the tungsten or molybdenum or tantalum core wire 10 should be subjected to thorough surface cleaning with a degreasing solvent such as methylene chloride before assembly. It is desirable to sterilize all components if the sensor is one for use in the body.

Although a preferred embodiment of the new oxygen sensor which is especially adapted for in vivo use has been described in considerable detail, such description is to be considered illustrative rather than limiting, for the invention may be variously embodied and is to be limited only by interpretation of the claims which follow.

We claim:

1. A sensor for determining the partial pressure of oxygen in a fluid sample, comprising:
   a. a first measuring electrode whose potential depends on oxygen concentration in a medium contacting it and is selected from the group of metals consisting of tungsten, molybdenum and tantalum and alloys thereof,
   b. a silver-silver halide reference electrode spaced from said first electrode,
   c. an electrolyte solution in mutual contact with at least a part of said electrodes, said electrolyte including cations and anions the latter of which are selected from the group of chloride, bromide and iodide anions, and said solution including a buffer,
   d. an oxygen permeable, ion impermeable membrane interfaced on one side with said electrolyte and having its other side exposed for contact with said sample, said membrane being arranged to provide the only path for transport of oxygen between said sample and said electrolyte.

2. The sensor defined in claim 1 wherein:
   a. said reference electrode is more particularly a silver-silver chloride electrode.

3. The sensor defined in claim 1 wherein:
   a. said buffer has a pH range between pH5 and pH8.

4. The sensor defined in claim 1 wherein:
   a. said first electrode is particularly tungsten and the pH of said buffer is at least pH5.

5. The sensor defined in claim 1 wherein:
   a. said electrolyte is comprised of cations selected from the group of sodium and potassium cations.

6. The sensor defined in claim 5 wherein:
   a. said electrolyte has a predetermined molarity for making it isoosmotic with said sample.

7. The sensor defined in claim 5 wherein:
   a. said electrolyte solution has a molarity of about 0.15M for making it substantially isoosmotic with said sample which is characterized as blood.

8. A potentiometric sensor for measuring the partial pressure of oxygen in blood, comprising:
   a. a first measuring electrode whose potential depends on oxygen concentration in a medium contacting it and is comprised of a thin wire selected from the class of tungsten, molybdenum and tantalum and alloys thereof,
   b. an insulating layer surrounding at least a portion of said wire and leaving a tip portion exposed,
   c. a silver-silver chloride reference electrode separated from said tip portion by said insulating layer,
   d. an electrolyte solution including a buffer in mutual contact with said tip and said reference electrode, and
   e. an oxygen permeable, ion impermeable membrane encapsulating said electrolyte.

9. The sensor set forth in claim 8 wherein:
   a. said electrolyte comprises a salt selected from the group of sodium chloride and potassium chloride.

10. The sensor defined in claim 9 wherein:
    a. said buffer has a pH of at least 5.

11. The sensor set forth in claim 10 wherein:
    a. said electrolyte is a substantially 0.15 Molar solution of said selected salt.

12. The sensor defined in claim 9 wherein:
    a. the molarity of said salt is substantially 0.15 Molar.

13. A sensor for determining the partial pressure of oxygen in a fluid sample comprising:
    a. a first electrode whose potential depends on oxygen concentration in a medium contacting it, characterized as being made of a metal which reduces oxygen coming in contact therewith and which simultaneously corrodes in an electrolyte solution to thereby acquire a potential dependent on the rates of reduction and corrosion, said metal being selected from the group consisting of tungsten, molybdenum and tantalum and alloys thereof
    b. a reference electrode spaced from said first electrode,
    c. an electrolyte solution in mutual contact with said first and reference electrodes and serving to intervene between said electrodes and said sample, and
    d. an oxygen permeable, ion impermeable membrane encapsulating said electrolyte.

14. The invention set forth in claim 13 wherein:
    a. said electrolyte solution includes anions selected from the group of chloride, bromide and iodide anions, and
    b. said reference electrode is a silver-silver halide electrode, the halide being the same as said selected anion.

15. The invention set forth in claim 14 wherein:
    a. said electrolyte solution contains a buffer that establishes the pH of said solution at substantially 5.

* * * * *